(12) United States Patent
Windisch et al.

(10) Patent No.: US 7,481,076 B2
(45) Date of Patent: Jan. 27, 2009

(54) APPARATUS FOR MAKING FIBERS

(75) Inventors: John Windisch, Corvallis, OR (US);
Patrick Svoboda, Philomath, OR (US);
Ron Reher, Corvallis, OR (US); Larry K. Coon, Albany, OR (US)

(73) Assignee: Evanite Fiber Corporation, Corvallis, OR (US)

( * ) Notice: Subject to any disclaimer, the term of this patent is extended or adjusted under 35 U.S.C. 154(b) by 553 days.

(21) Appl. No.: 11/007,075

(22) Filed: Dec. 7, 2004

(65) Prior Publication Data

US 2006/0117803 A1    Jun. 8, 2006

(51) Int. Cl.
*C03B 37/04* (2006.01)

(52) U.S. Cl. .............................. 65/516; 65/517; 65/522; 425/8

(58) Field of Classification Search .................... 65/522, 65/516, 517, 524, 525; 425/8
See application file for complete search history.

(56) References Cited

U.S. PATENT DOCUMENTS

| | | | |
|---|---|---|---|
| 2,855,626 A | 10/1958 | Firnhaber |
| 2,931,422 A | 4/1960 | Long |
| 3,014,235 A | 12/1961 | Snow |
| 3,080,736 A | 3/1963 | Mabru et al. |
| 3,114,618 A | 12/1963 | Levecque et al. |
| 3,174,182 A | 3/1965 | Duncan |
| 3,179,507 A | 4/1965 | Levecque et al. |
| 3,285,723 A | 11/1966 | Levecque et al. |
| 3,346,356 A | 10/1967 | Anderson et al. |
| 3,372,011 A | 3/1968 | Porter |
| 3,547,610 A | 12/1970 | Holman |
| 3,650,716 A | 3/1972 | Brossard |
| 3,746,524 A | 7/1973 | Kirchheim |
| 3,928,009 A | 12/1975 | Perry |
| 4,046,539 A | 9/1977 | Pitt |
| 4,359,444 A | 11/1982 | Shah et al. |
| 4,478,624 A | 10/1984 | Battigelli et al. |

(Continued)

FOREIGN PATENT DOCUMENTS

EP    0 329 118 A2    8/1989

OTHER PUBLICATIONS

European Search Report for corresponding European Application No. 5257254.

(Continued)

*Primary Examiner*—John Hoffmann
(74) *Attorney, Agent, or Firm*—Klarquist Sparkman, LLP (57) ABSTRACT

A duct assembly is employed for directing a central air flow upwardly toward the rotating spinner assembly of a rotary-type fiberizer that produces a downwardly flowing column of fibers. The central air flow eliminates the low-pressure zone that normally occurs beneath the spinner assembly of conventional fiberizers. The cross-sectional profile of a lower portion of the duct is vertically elongated where the duct passes through the fiber column so as to facilitate the flow of the fiber column over the duct. A shielding member can be positioned to deflect the central air flow away from the spinner assembly and against the interior of the fiber column to insulate the spinner assembly from the relative cool air flow. In another embodiment, a conduit extends through the fiberizer spinner assembly and directs a cooling gas beneath the spinner assembly within the interior of the fiber column.

10 Claims, 9 Drawing Sheets

U.S. PATENT DOCUMENTS

| | | |
|---|---|---|
| 4,601,742 A | 7/1986 | Kaveh |
| 4,627,868 A | 12/1986 | Kaveh |
| 4,678,490 A | 7/1987 | Miller et al. |
| 4,689,061 A | 8/1987 | Britts, II et al. |
| 4,832,723 A | 5/1989 | Shisler et al. |
| 4,909,817 A | 3/1990 | Gill et al. |
| 5,076,826 A | 12/1991 | Teeter |
| 5,582,841 A | 12/1996 | Watton et al. |

OTHER PUBLICATIONS

Drawing of Spinner Shield Assembly (prior to Dec. 7, 2003).
Document titled "Evanite Fiber Corporation Glass Fiber Plant Line 2 Production Alert" (not published, dated May 12, 2003) regarding ductwork for a fiberizer for making glass fibers.

APPARATUS FOR MAKING FIBERS

FIELD

The present disclosure relates to embodiments of an improved apparatus and method for making fibers from thermoplastic material.

BACKGROUND

One process for producing very small diameter fibers from thermoplastic material, such as glass, polyester, or polypropylene, is known as rotary fiberization. Apparatus for producing fibers by rotary fiberization are described in U.S. Pat. Nos. 4,046,539 and 4,627,868. These apparatus are commonly referred to as "fiberizers."

A rotary-type fiberizer includes mechanisms for directing molten thermoplastic material, such as glass, into a rapidly rotating fiberizer spinner. The spinner has a plurality of small openings formed in its peripheral wall. The molten glass is forced out of the openings by the centrifugal force that is generated by the rotating spinner.

The fiberizer also includes an annular nozzle that surrounds the rotating spinner and is shaped to direct heated gas downwardly against the streams of molten glass that emanate from the spinner openings. The gas from the nozzle attenuates the molten glass streams into fine fibers and directs them downwardly. The fibers collectively fall from the spinner in the shape of a generally tubular column known as a veil. The fiber veil falls upon a conveyor surface that moves beneath the fiberizer. The fibers collect as a mat on the conveyor.

Normal operation of a rotary-type fiberizer generates a high-temperature, low-pressure (i.e., below ambient) zone directly beneath the fiberizer spinner. The air flow within the low-pressure zone is such that portions of the fiber veil separate from the veil and are drawn into the zone. These separated portions later flow outwardly against the veil. The separated fibers that flow outwardly from the low-pressure zone stick to the veil as chunks known as "remelt." An excessive accumulation of remelt has a deleterious effect on the quality of the fiber mat.

Irrespective of the type of mechanism used for forming fibers of thermoplastic material, the fibers are often used in the manufacture of paper products, and it is desirable that the fibers provide in the sheet relatively high tensile strength, elongation, and energy absorption.

SUMMARY

This present disclosure is directed to an improved apparatus and methods for making fibers from thermoplastic material, such as glass. According to one aspect, an apparatus is provided for assisting in preventing the formation of a low-pressure zone beneath the spinner assembly of a rotary-type fiberizer.

In particular embodiments, a duct assembly is located beneath the fiberizer spinner assembly. An open end of the duct assembly is located near the fiberizer spinner assembly, and the duct assembly extends downwardly from the open end, concentric with the vertical rotational axis of the spinner assembly. The duct assembly delivers a column of gas upwardly toward the underside of the spinner assembly so that the gas is deflected against the inside of the fiber veil that descends from the fiberizer. The upward flowing column of gas assists in preventing the formation of a high temperature, low-pressure zone beneath the spinner assembly, thereby substantially reducing the amount of remelt that is produced by the fiberizer.

A lower portion of the duct assembly extends through the path of the fiber veil. In particular embodiments, the lower portion of the duct assembly has a cross-sectional profile that is elongated in the direction of the path of the column of fibers where the fiber veil falls over the duct assembly to facilitate the flow of the fiber veil over the duct assembly and minimize the formation of remelt on the outer surface of the duct assembly. In particular embodiments, for example, the lower portion of the duct assembly has a cross-sectional profile that has two curved end margins defining a length and straight side margins extending between respective ends of the end margins and defining a width. The length of the cross-sectional profile is greater than the width and extends in the direction of the fiber veil where it falls over the lower portion of the duct assembly. In some embodiments, the cross-sectional profile of the lower portion of the duct assembly can be tapered or narrowed in the downward direction where the fiber veil flows over the lower portion of the duct assembly. In other embodiments, the cross-sectional profile of the duct can be tapered in the upward direction where the fiber veil flows over the duct.

Optionally, the duct assembly may include a mechanism for precisely adjusting the position of the open end of the duct assembly relative to the spinner. Using the adjustment mechanism and varying the pressure of the gas in the duct assembly makes it possible to control the velocity and volume of gas that flows against the interior of the fiber veil so that the temperature and shape of the veil can be controlled.

In particular embodiments, a shielding member or barrier may be positioned below the spinner assembly to direct the gas exiting the open end of the duct assembly away from the spinner assembly and against the interior of the column of fibers. Advantageously, this insulates the rotating bowl of the spinner assembly from the relatively cool gas from the duct assembly to prevent solidification of molten material in the bowl. The shielding member can be supported by a support post that extends downwardly from the shielding member into the open end of the duct assembly and is mounted to support struts inside the duct assembly.

In lieu of or in addition to the shielding member, the spinner assembly can have an insulated heat shield mounted below the bowl. The heat shield can comprise any suitable heat-insulating device that minimizes heat loss from the bowl and insulates the bowl from the central gas flow from the duct assembly. For example, the heat shield can include a layer of insulating material, such as ceramic fiber, carbon fiber or other suitable insulating materials.

In certain embodiments, the spinner assembly can include a shielding assembly of multiple shielding members mounted below the bowl. The shielding assembly includes a first shielding member and a second shielding member mounted below the first shielding member. The second shielding member can be formed with raised protrusions along an outer peripheral edge thereof to space the second shielding member from the first shielding member so as to create an air gap therebetween.

In another embodiment, a rotary-type fiberizer is provided with a gas conduit that extends downwardly through the spinner assembly to introduce a gas beneath the spinner assembly within the fiber veil. The gas assists in preventing the formation of a high temperature, low-pressure zone beneath the fiberizer spinner. In specific embodiments, the temperature of the gas is maintained below the melting temperature of the fibers, thereby quickly cooling the veil to improve the tensile strength and elongation characteristics of the fibers.

The foregoing and other features and advantages of the invention will become more apparent from the following detailed description of several embodiments, which proceeds with reference to the accompanying figures.

DETAILED DESCRIPTION

Figure 1:
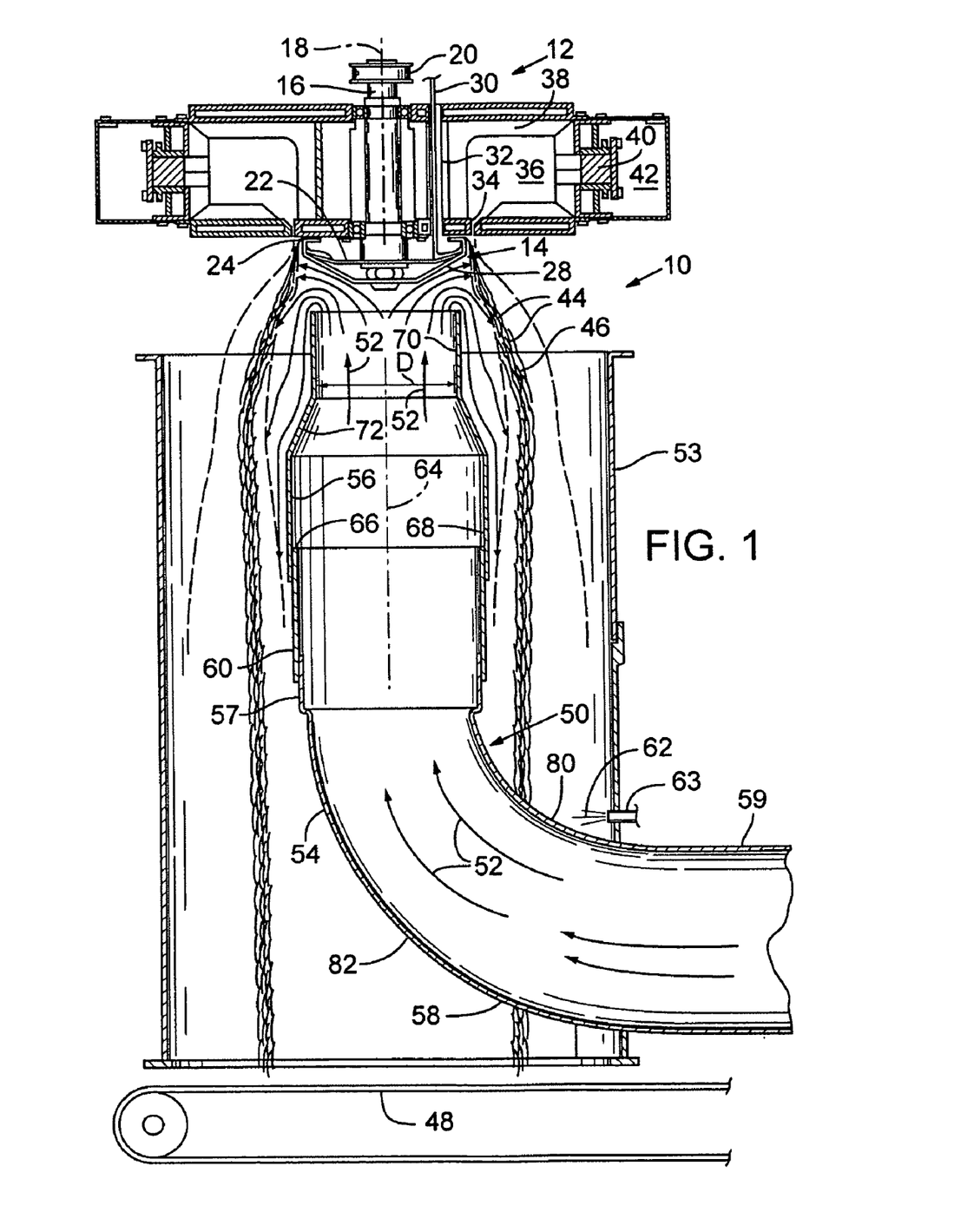
FIG. 1 is a vertical cross-sectional view of an apparatus for making glass fibers, according to one embodiment.

FIG. 1 shows an apparatus 10 for making glass fibers, according to one embodiment. The apparatus includes a conventional fiberizer 12 that includes a spinner assembly 14 that is mounted to a rotatable spindle 16. The spindle 16 is rotated at very high speed about its longitudinal axis 18 by a motor (not shown), which can be connected to a belt-driven pulley 20 that is mounted to the upper end of the spindle 16.

The spinner assembly 14 rotates with the spindle 16 and includes an internal bowl 22. The bowl 22 has an annular, peripheral wall 24 that includes a plurality of small-diameter openings (not shown). The spinner assembly 14 includes on its underside an integral heat shield 28. The cross sectional shape of the illustrated shield 28 is an inverted frustum. The shield 28 reduces heat loss from the bowl 22 of the spinner assembly 14.

As the spinner assembly 14 is rotated, molten glass 30 is directed through a drop tube 32 in the fiberizer 12 and lands in the bowl 22. The molten glass 30 is driven by centrifugal force through the bowl openings (not shown). The streams of molten glass that emanate from the bowl openings pass beneath an annular nozzle 34 that surrounds the rotating spinner assembly 14. A continuous jet of heated gas (known as the "outer blast") is forced downwardly through the nozzle 34. The heated gas is provided by combustion of a fuel gas within an annular chamber 36 that is lined with refractory 38. The premixed fuel desirably is supplied through screens 40 that prevent flames from traveling back into the fuel supply manifold 42.

The gas from the nozzle 34 attenuates the molten glass streams into fine fibers 44 and directs them downwardly. The fibers fall from the spinner assembly 14 in the shape of a generally tubular column known as a fiber veil 46. The fiber veil 46 falls upon a conveyor surface 48 that moves beneath the fiberizer. The fiber veil 46 collects as a mat on the conveyor surface 48. Other types of collection devices can be used instead of the illustrated conveyor surface. For example, a rotating drum can be positioned under the housing to collect the fiber veil 46.

In alternative embodiments, the gas, air, and fibers may be delivered by conduits to a remote location for collection as a mat.

During operation of a conventional fiberizer 12, a zone of recirculating hot, low-pressure (i.e., below ambient) air is formed immediately beneath the spinner shield 28. The air flow within this low-pressure zone defines a generally toroidal path that is centered about the vertical rotational axis 18 of the spinner assembly 14. As discussed earlier, the presence of such a low-pressure zone and toroidal air flow therethrough results in some of the fibers 44 being separated from the veil 46 and later returned to the hot veil beneath the nozzle 34 where they remelt, thereby forming "remelt" in the veil. The presence of remelt lowers the quality of the fiber mat that is collected.

To eliminate the low-pressure zone that normally forms beneath the spinner assembly 14, a duct assembly 50 (also referred to herein as a gas conduit) is provided to direct toward the center of the spinner assembly 14 a continuous flow of gas, such as air. For convenience, the flow of air through the duct assembly 50 will be hereafter referred to as the central air flow as represented by arrows 52. In order to enhance a uniform flow of the veil 46 (i.e., without any undulations that may be introduced by air currents outside the veil) a cylindrical housing 53 may be mounted to substantially surround the fiber veil 46 beneath the upper end of the duct assembly 50. Consequently, the veil 46 falls between the housing 53 and the duct assembly 50, with the housing 53 serving as a shield that protects the integrity of the veil 46. A vacuum is applied to the lower end of the housing 53 to facilitate the flow of the heated gas from the nozzle 34 downwardly through the housing 53, which is effective to reduce the formation of remelt.

The duct assembly 50 comprises a lower portion 54 (termed a "riser tube"), an upper portion 56 (termed an "end tube"), and an intermediate duct portion 60 extending between the lower portion 54 and the upper portion 56. The lower portion 54, the intermediate duct portion 60, and the upper portion 56 can be assembled in any suitable manner, such as by welding the components together or using mechanical fasteners to secure the components to each other.

The lower portion, or riser tube, 54 can be shaped as a 90 degree elbow as shown, and is fluidly connected at its lower end to a supply duct (not shown) outside the housing 53. The supply duct is fluidly connected to a source of air (e.g., a fan) or other gas (not shown) that can be regulated to vary the air or gas pressure, or the chemical make-up, moisture content, and/or temperature of the air or gas within the duct assembly 50. The riser tube 54 extends from the supply duct (not shown) through a correspondingly sized opening in the housing 53 through the tubular fiber veil 46 and curves upwardly within the veil interior. The intermediate duct portion 60 and the end tube 56 are located beneath the spinner assembly 14.

The intermediate duct portion 60, the end tube 56, and the riser tube 54 at its upper end 66 define a centerline 64 that desirably is collinear with the rotational axis 18 of the fiberizer spinner assembly 14.

The end tube 56 in the illustrated embodiment has a lower end portion 68 and an upper end portion 70. The end tube 56 is generally circular in cross section except for an intermediate flared portion 72 extending between the lower end portion 68 and the upper end portion 70. The inside diameter D of the upper end portion 70 desirably is slightly less than the outside diameter of the bowl 22, as measured between diametrically opposed points on the peripheral wall 24 of the bowl 22. Although variable, the inside diameter D of the upper end portion 70 desirably is about 5% to 30% less than the outside diameter of the bowl 22.

The flared portion 72 increases the inside diameter of the lower end portion 68 of the end tube 56 to an amount that is slightly greater than the inside diameter of the intermediate duct portion 60. Accordingly, the lower end portion 68 of the end tube 56 will fit around the upper end portion of the duct portion 60. The end tube lower end portion 68 and the intermediate duct portion 60 desirably have a greater diameter than the end tube upper end portion 70 to maximize the volume of central air 52 that can be directed to the spinner assembly 14.

Use of a flared (that is, increasing diameter in the downward direction) end tube 56 is also advantageous because it forces the central air 52 radially outward as that air moves along the exterior of the end tube 56. The effect of the outward movement of the air is to spread the fiber veil 46 to increase its diameter and surface area for increased efficiency in cooling the veil.

Figure 3:
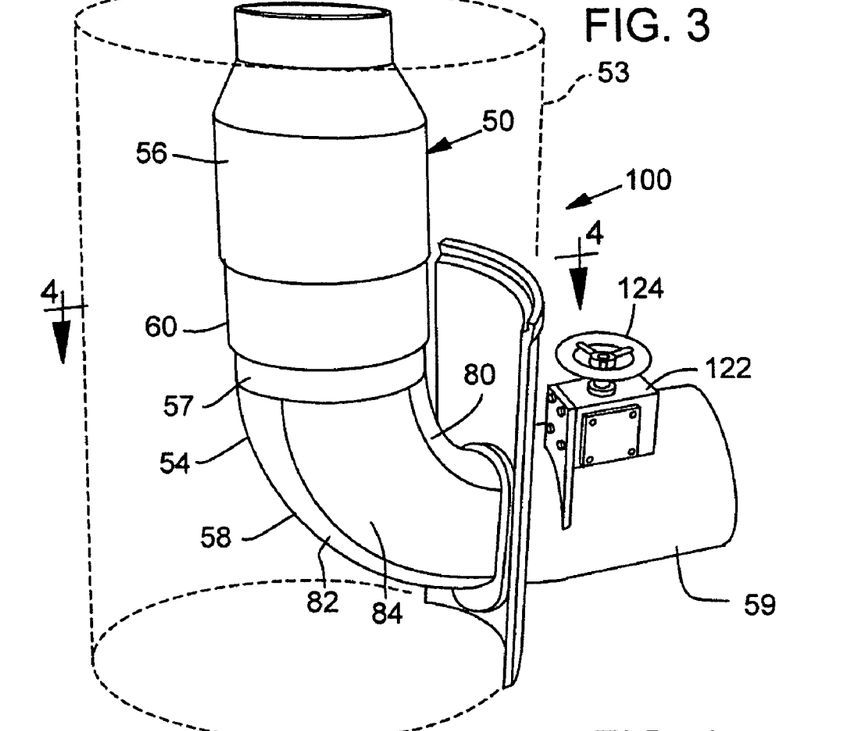
FIG. 3 is a perspective view of the duct assembly and outer housing of the apparatus of FIG. 2.
Figure 4:
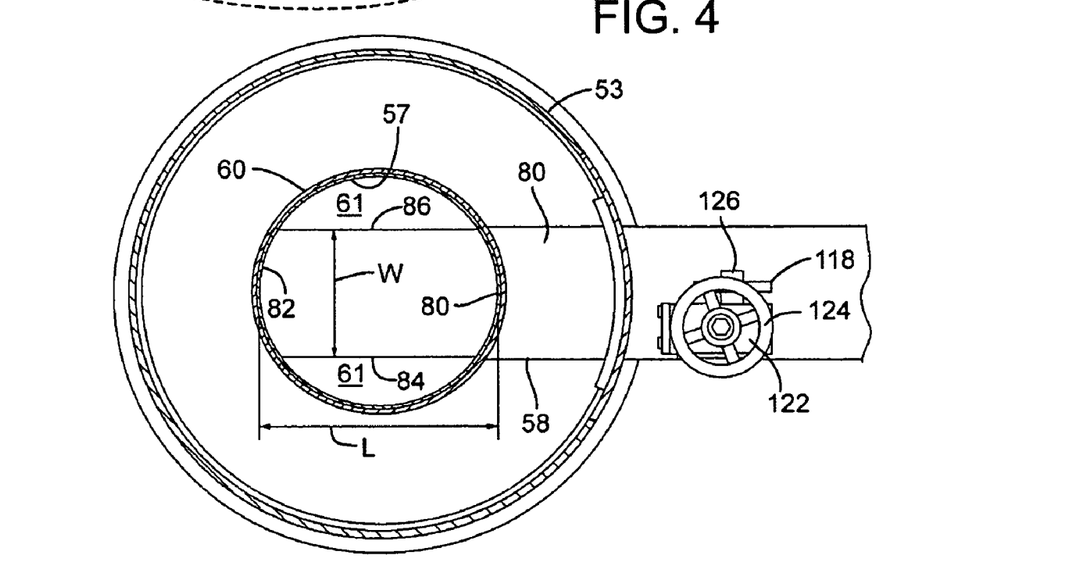
FIG. 4 is a cross-sectional view of the apparatus of FIG. 3 taken along line 4-4 of FIG. 3.

The riser tube 54 in the illustrated embodiment is formed with a generally cylindrical upper end portion 57 having a diameter slightly less than that of the intermediate duct portion 60. Accordingly, the intermediate duct portion 60 will fit around the riser tube upper portion 57. The illustrated riser tube 54 is also formed with an intermediate portion 58 extending from the inside surface of the housing 53 to the cylindrical upper portion 57. The intermediate portion 58 of the riser tube desirably has a reduced cross-sectional area (as best shown in FIGS. 3 and 4) to facilitate the flow of the fiber veil 46 over the intermediate portion 58 and to minimize the formation of "remelt" on the upper surface thereof, as further described below. A lower end portion 59 of the riser tube 54 extends outside the housing 53 for connection to the supply duct (not shown). The riser tube lower end portion 59 can have a generally circular cross section.

Other configurations of the duct assembly are also possible. In one implementation, for example, the end tube 56 and the intermediate duct portion 60 can be replaced with a single piece of ducting. In another implementation, the riser tube upper end portion 57, the intermediate duct portion 60, and the end tube lower end portion 68 can be of the same diameter and can be connected to each other using any of various suitable techniques or mechanisms. In another implementation, the entire duct assembly 50 can have a one-piece, or unitary, construction.

In use, a jet of air 62 may be forced through a small nozzle 63 extending through the housing 53 immediately above the lower portion 58 of the riser tube 54. The jet of air 62 assists in reducing the accumulation of fibers at the junction of the housing 53 and the upper surface of the riser tube intermediate portion 58.

Figure 2:
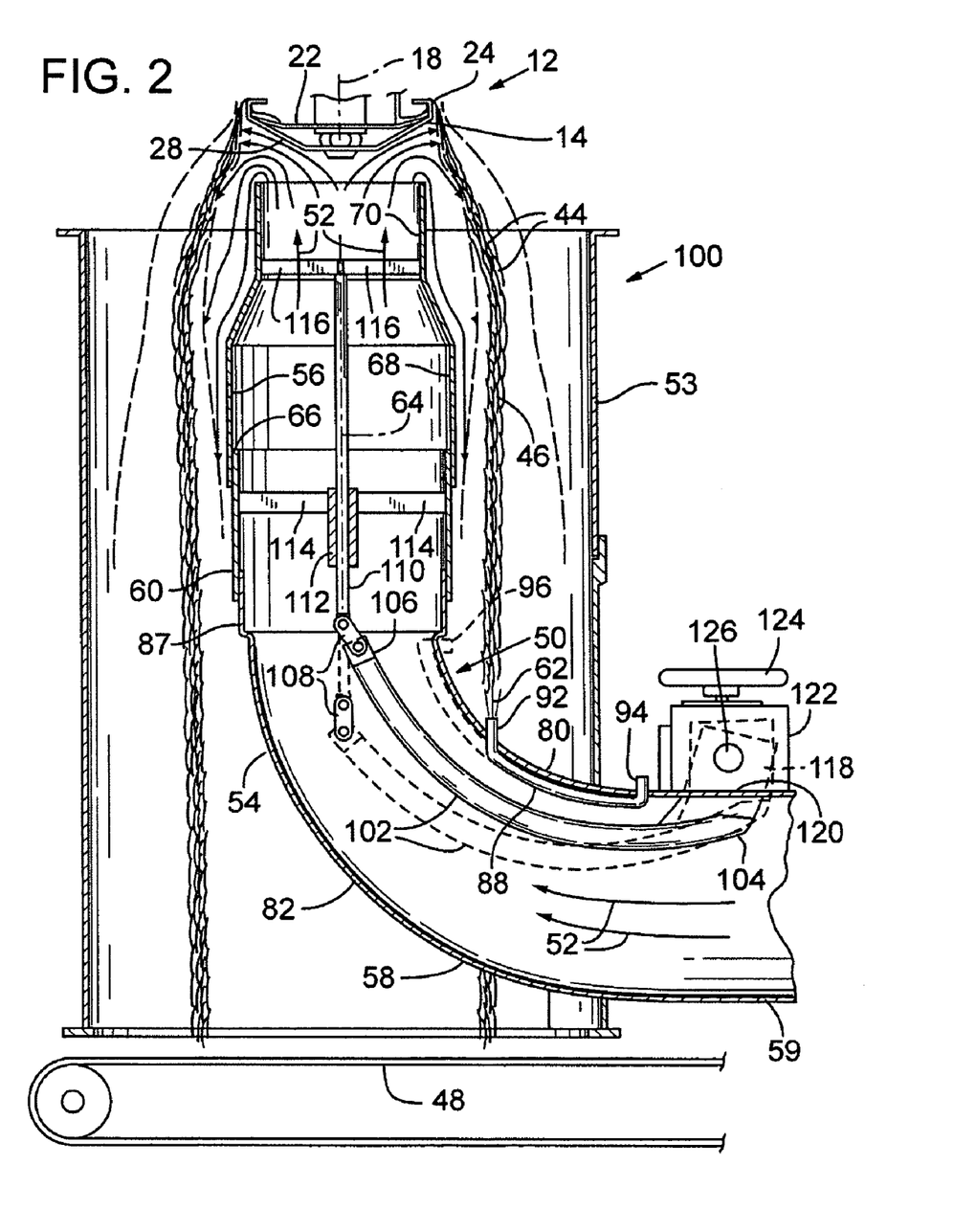
FIG. 2 is a vertical cross-sectional view of another embodiment of an apparatus for making glass fibers having a mechanism for adjusting the position of a duct relative to a fiberizer.

FIG. 2 illustrates an apparatus 100 for making glass fibers, according to another embodiment. This embodiment shares many similarities with the embodiment of FIG. 1. Hence, components in FIG. 2 that are identical to corresponding components in FIG. 1 are given the same reference numerals. The main difference between the apparatus 10 of FIG. 1 and the apparatus 100 of FIG. 2 is that the latter includes an adjustment mechanism that permits adjustment of the position of the upper end of the end tube relative to the spinner assembly 14 to vary the characteristics of the central air flow 52.

The illustrated adjustment mechanism for adjusting the end tube position includes a rigid, curved adjustment arm 102 that is mounted to the riser tube 54 in a manner such that an outer end 104 of the arm 102 may be cranked so that the inner end 106 of the arm moves upwardly or downwardly within the riser tube 54.

The inner end 106 of the adjustment arm 102 is linked, via a conventional chain-type link 108 to the flattened lower end of an adjustment rod 110. The central longitudinal axis of the adjustment rod 110 is collinear with the centerline 64 of the riser tube 54. In this regard, the rod 110 is mounted to slide through a guide bearing 112 that is secured near the riser tube upper end 66 concentric with the centerline 64. The bearing can be secured by struts 114 that extend radially between the guide bearing 112 and the inner wall of the riser tube 54.

The upper end of the adjustment rod 110 includes radially extending struts 116 fastened to the rod 110 and to the inner wall of the end tube 56. Accordingly, as the inner end 106 of the adjustment arm 102 is moved upwardly or downwardly, the end tube 56 is forced upwardly or downwardly, telescopically sliding along the upper portion 60 of the riser tube 54.

Adjustment of the arm 102 can be achieved by any suitable mechanism or techniques. In the illustrated embodiment, for example, the outer end 104 of the arm 102 is connected to a plate 118 that extends through a slot 120 formed in the lower end portion 59 of the riser tube 54. A gear mechanism 122 is mounted to the exterior of the riser tube 54 and is operatively connected to the plate 118 so that rotation of a handle 124 of the gear mechanism 122 rotates the adjustment arm 102 about the axis of a crank shaft 126 that passes through (i.e., perpendicular to the plane of FIG. 2) the plate 118. The curvature of the arm 102 is such that rotation of the arm about the axis of the crank shaft 126 produces the upward or downward motion of the inner end 106 of the arm as described above.

The duct assembly 50 directs a sufficient volume of central air 52 upwardly against the underside of the spinner assembly 14 so that the central air 52 is deflected by the spinner assembly 14 against the interior of the tubular fiber veil 46. It can be appreciated that the presence of the duct assembly 50 and upward central air flow 52 prevents the formation of any low-pressure zone (with attendant toroidal air circulation) beneath the spinner assembly 14. As a result, the amount of remelt occurring within the fiber veil is substantially reduced relative to the amount that would occur in the absence of the central air flow 52.

The source of the central air flow 52 desirably supplies air at or below ambient temperature. The relatively cool (that is, with respect to the temperature of the fiber veil 46) central air flow 52 quickly lowers the temperature of the fiber veil 46 to below the melting temperature of the fibers 44. The application of the cool air as just described increases the tensile strength and the elongation of the paper sheets (or other products) manufactured from the fibers 44.

The pressure of the central air flow 52, and the position of the upper end 70 of the end tube 56 relative to the spinner assembly 14 can be adjusted so that the velocity of the central air 52 that impinges upon the interior of the veil 46 is sufficient to prevent the formation of a low-pressure zone adjacent to the spinner assembly 14 and to increase the veil diameter and to direct the veil 46 away from the exterior surfaces of the end tube 56 and the upper portion 60 of the riser tube 54. For example, for a conventional fiberizer 12 having a 23 cm diameter spinner that is driven at about 4000 revolutions per minute (although the rotational speed of the fiberizer can vary from about 3000 rpm to about 5000 rpm), the central air flow 52 through the duct assembly 50 should be in the range of about 0.7 cubic meters per second to about 1.2 cubic meters per second. The upper end 70 of the end tube 56 should be spaced between about 2 centimeters and 8 centimeters from the peripheral wall 24 of the spinner assembly bowl 22.

As mentioned above, the riser tube 54 can be formed with an intermediate portion 58 having a reduced cross-sectional area. Referring to FIGS. 3 and 4, for example, the intermediate portion 58 in the illustrated configuration has a generally oval cross-sectional profile and is formed with arcuate or curved end surfaces 80, 82 and flat side surfaces 84, 86 extending between respective ends of surfaces 80, 82. At the upper end of the riser tube intermediate portion 58, horizontal plates 61 (FIG. 4) extend between the side surfaces 84, 86 and the bottom edge of the upper portion 57 of the riser tube. As illustrated in FIG. 4, the cross-sectional profile of the intermediate portion 58 has a length L, measured between the end surfaces 80, 82, and a width W, measured between the side surfaces 84, 86 that is less than the length L. The length L can be equal to the diameter of the riser tube upper end portion 57.

As can be appreciated, the cross-sectional profile of the riser tube is vertically elongated in the direction of the downwardly flowing fiber veil 46 (FIGS. 1 and 2) where the veil flows over the riser tube. Advantageously, this allows the fiber veil 46 to flow more easily over the riser tube onto the conveyor 48 (FIGS. 1 and 2) to minimize the accumulation of fibers on the upper surface of the riser tube. Another advantage of certain embodiments sharing a reduced cross-sectional profile of the riser tube is that there is less restriction to air flow between the housing 53 and the duct assembly 50. As such, the vacuum at the collector below the housing 53 can be reduced without causing the formation of remelt on the lower portion of the riser tube.

In addition, as shown in FIG. 2, a compressed-gas conduit, or line, 88 can be provided to direct compressed gas (e.g., compressed air) against the fiber veil 46. As shown, the illustrated compressed-gas line 88 has an inlet 94 outside the housing 53 which can be connected to a pressure regulator (not shown). The compressed-gas line 88 extends through the riser tube 54 from the inlet 94 to an outlet 92. Alternatively, the compressed-gas line can be positioned to extend along the upper surface of the riser tube 54. In any case, the outlet 92 of the compressed-gas line is positioned to direct compressed gas upwardly against the bottom edge of the fiber veil, causing the fiber veil to flow outwardly and away from the riser tube and thereby reducing the accumulation of fibers on the upper surface of the riser tube. Alternatively, the compressed-gas line can have an outlet 96 (shown in dashed lines in FIG. 2) that is positioned to direct compressed gas in a generally horizontal direction against the inside of the fiber veil 46 to facilitate the flow of the fiber veil over the riser tube.

EXAMPLE 1

In one specific embodiment, the upper portion 57 of a riser tube 54 had a diameter of about 10 inches (which defines a cross-sectional area of about 78.5 inches$^2$). The intermediate portion 58 of the riser tube had a cross-sectional profile that was shaped as shown in FIGS. 3 and 4. The length L (FIG. 4) of the cross-sectional profile was about 10 inches and the width W (FIG. 4) of the cross-sectional profile was about 6 inches to reduce the cross-sectional area of the intermediate portion to less than 78.5 inches$^2$. The housing 53 had a diameter of about 24 inches. The apparatus can be used to produce fibers in the range of about 0.5 microns to about 7.0 microns in diameter. Of course, these specific dimensions (as well as other dimensions provided in the present specification) are given to illustrate the invention and not to limit it. The dimensions provided herein can be modified as needed in different applications or situations.

EXAMPLE 2

A riser tube was shaped as shown in FIGS. 3 and 4. The upper portion 57 of the riser tube had a diameter of about 10 inches and the intermediate portion 58 of the riser tube had a cross-sectional profile measuring about 10 inches in length and about 6 inches in width. The housing 53 had a diameter of about 24 inches. The riser tube and a rotary-type fiberizer were used to make 3.0-micron glass fibers. For comparison, a conventional cylindrical riser tube (without a reduced cross-sectional profile) having a 10 inch diameter was used to make glass fibers of the same size. The results are shown in FIGS. 12A-12B.

Figure 12A:
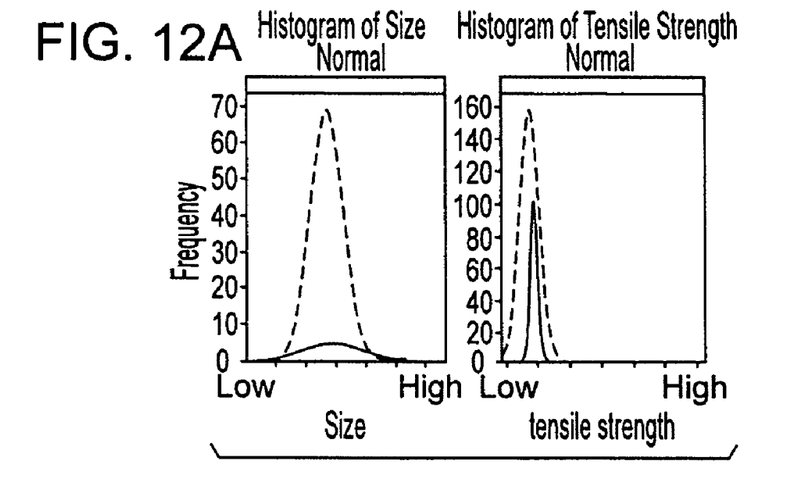
FIGS. 12A-12B show size and tensile strength (FIG. 12A), elongation (FIG. 12B), and shot (FIG. 12C) for glass fibers produced using the riser tube shown in FIGS. 2-4 relative to a conventional, cylindrical riser tube.
Figure 12B:
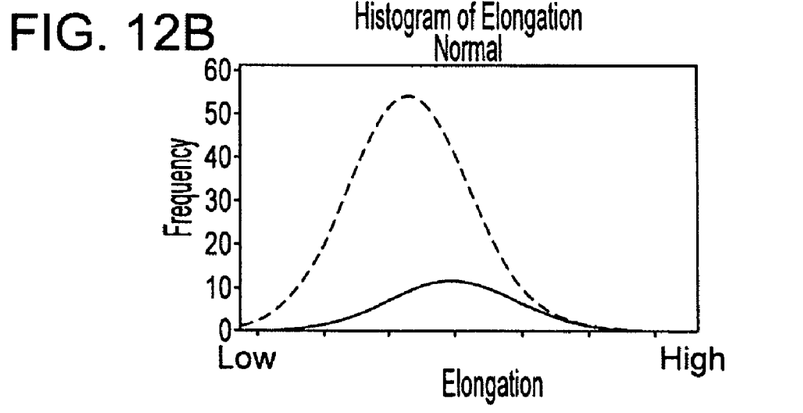
Figure 12C:
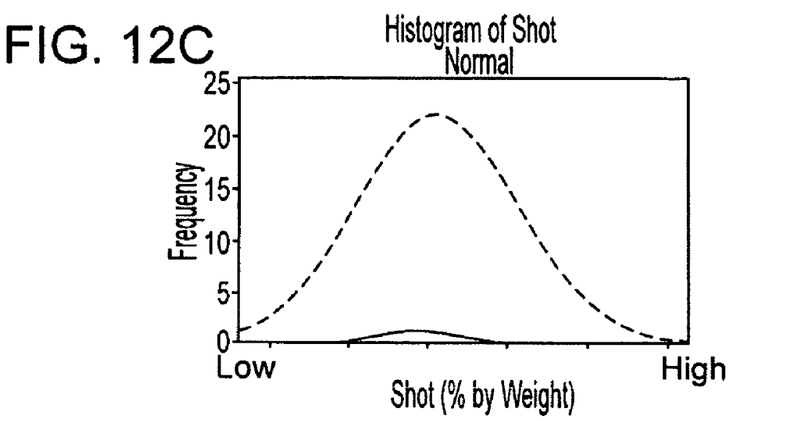

In FIGS. 12A-12B, the graphs shown in solid lines represent the results from using the riser shown in FIGS. 3 and 4 and the graphs shown in dashed lines represent the results from using the conventional riser tube. Notably, the mean values for air resistance were similar but the tensile strength (FIG. 12A) and elongation (FIG. 12B) were greater for the glass fibers made using the riser tube of FIGS. 3 and 4, resulting in a stronger, tougher product while maintaining similar air resistance. An additional benefit of the riser tube of FIGS. 3 and 4 is that the mean value for percent by weight of shot (the amount of unfiberized glass in the resulting fiber mat) (FIG. 12C) was less for the glass fibers made using this riser tube. In addition, when the riser of FIGS. 3 and 4 was used, a vacuum of 0.2 in-H$_2$O at the collecting drum for the housing was able to collect fiber without remelt, whereas a vacuum of 0.5 in-H$_2$O was required for the conventional riser tube to collect fiber without remelt formation. Advantageously, since the system of FIGS. 3 and 4 can be operated at a reduced vacuum, a significant energy savings can be achieved.

Figures 5, 6A:
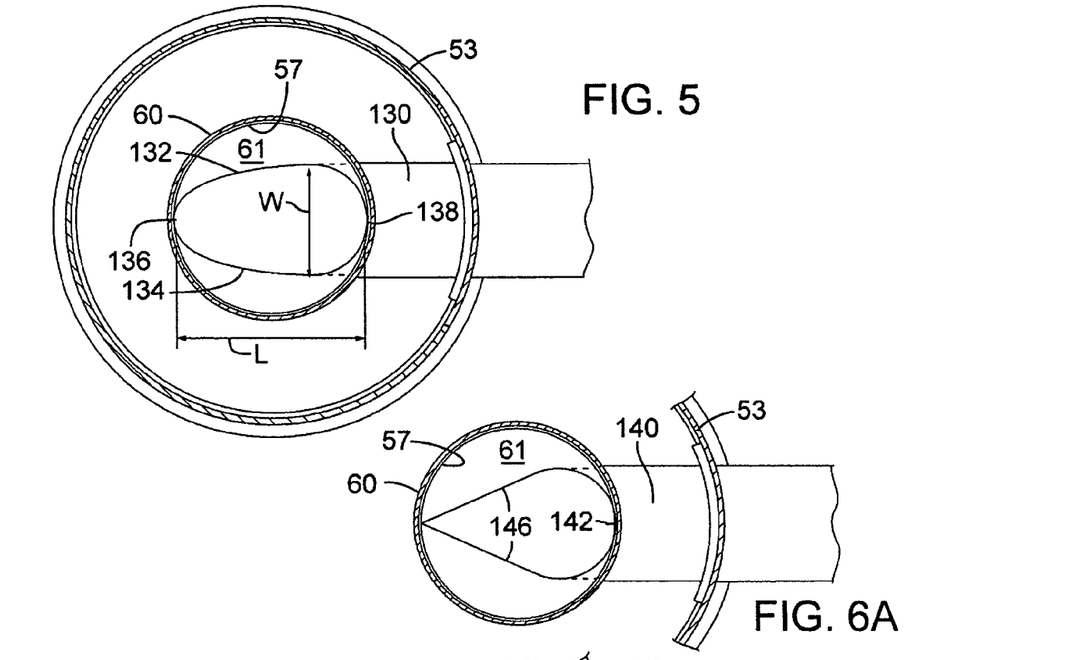
FIGS. 5-7 are horizontal cross-sectional views similar to FIG. 4 showing alternative shapes for the lower portion of the duct assembly.
Figure 6B:
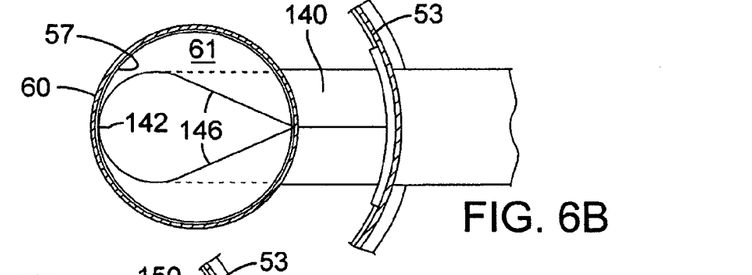
Figure 7:
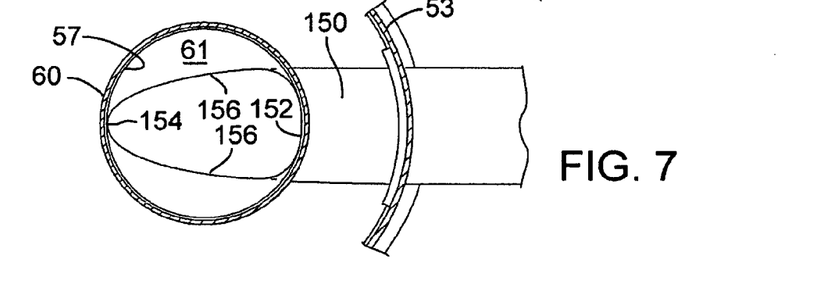

FIGS. 5-7 show alternative riser tube configurations that are elongated in the direction of fiber veil path where the fiber veil flows over the riser tube. In the embodiments shown in FIGS. 5, 6A, and 7, the cross-sectional profile of the riser tube is tapered in the downward direction where the fiber veil flows over the riser tube. FIG. 6B shows an embodiment of a riser tube that is tapered in the upward direction.

FIG. 5, for example, shows a riser tube intermediate portion 130 that is formed with a cross-sectional profile having curved end margins 136, 138 and side margins 132, 134 that extend between the end margins and converge or taper moving in a direction away from the end margin 138. The cross-sectional profile has a length L, measured between the end margins 136, 138 and a maximum width W, measured perpendicularly to the length, between the side margins 132, 134. In a specific implementation of the embodiment shown in FIG. 5, the length L is about 10 inches and the width W is about 6 inches.

FIG. 6A shows a riser tube intermediate portion 140 that is formed with a cross-sectional profile having a curved end margin 142 and side margins 146 that extend from respective ends of the end margin 142 and converge to a common point opposite the end margin 142. FIG. 6B shows the riser tube intermediate portion 140 positioned such that the narrow edge is at the top and the end margin 142 is at the bottom where the duct extends between the duct portion 57 and the housing 53. Thus, in the embodiment of FIG. 6B, the riser tube tapers in the upward direction where the fiber veil flows over the riser tube.

FIG. 7 shows a riser tube intermediate portion 150 that is formed with a cross-sectional profile having curved end margins 152, 154 and side margins 156 that extend between the end margins and converge moving in a direction away from the end margin 152. The cross-sectional profile of the riser tube shown in FIG. 7 is similar to that shown in FIG. 5, except that the end margin 152 (FIG. 7) is provided with a radius of curvature that substantially conforms to the radius of curvature of the upper portion 57 of the riser tube, and the end margin 154 (FIG. 7) has a slightly smaller radius of curvature than the end margin 136 (FIG. 5).

In alternative embodiments, the intermediate portion of the riser tube can have various other cross-sectional profiles. For example, the intermediate portion of the riser tube can be provided with a cross-sectional profile that is generally rectangular, triangular, trapezoidal, oval, elliptical, or a combination of two or more of the foregoing or other shapes.

Figure 8:
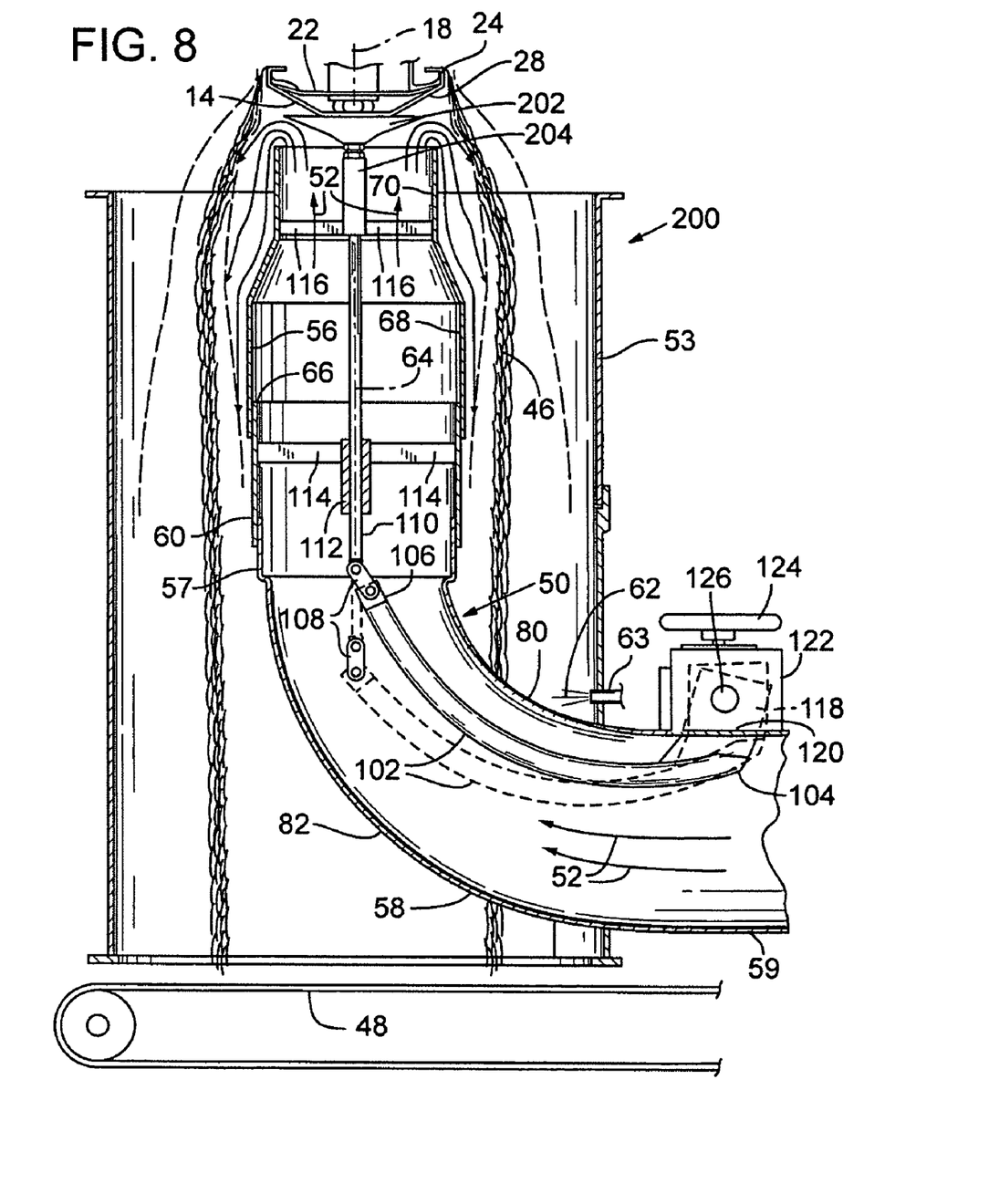
FIG. 8 is a vertical cross-sectional view of another embodiment of an apparatus, illustrating a barrier for deflecting gas from the duct assembly against the interior of the column of fibers.

FIG. 8 illustrates an apparatus 200 for making glass fibers, according to another embodiment. This embodiment shares many similarities with the embodiment of FIG. 2. Hence, components in FIG. 8 that are identical to corresponding components in FIG. 2 are given the same reference numerals. The main difference between the apparatus 100 of FIG. 2 and the apparatus 200 of FIG. 8 is that the latter includes a barrier, or shield, 202 (also referred to herein as a shielding member or gas deflector) positioned between the upper end of the end tube 56 and the spinner assembly 14.

As shown in FIG. 8, the shield 202 in the illustrated configuration is in the form of an inverted cone and is mounted on a support rod 204. The bottom end of the support rod 204 is mounted to the struts 116 within the end tube 56. The shield 202 deflects the upwardly flowing central air flow 52 outwardly and away from the spinner assembly 14. As noted above, the central air flow may be at or below room temperature to facilitate cooling of the fiber veil. In some cases, the central air flow can cause solidification of the molten material within the bowl 22 of the spinner assembly 14, which requires premature removal of the assembly for maintenance and results in lost production time. Advantageously, shielding the spinner assembly 14 from the relatively cool central air flow 52 with the shield 202 is effective to minimize solidification of the molten material within the bowl 22.

Additionally, the shield 202 desirably is spaced below the spinner shield 28 of the spinner assembly 14 so as to create an air gap between the shield and the spinner assembly to insulate the spinner assembly from the central air flow. Although not shown in figures, the shield 202 can include an insulating layer of ceramic fiber or any of various other insulating materials to further insulate the spinner assembly from the central air flow.

Figure 9A:
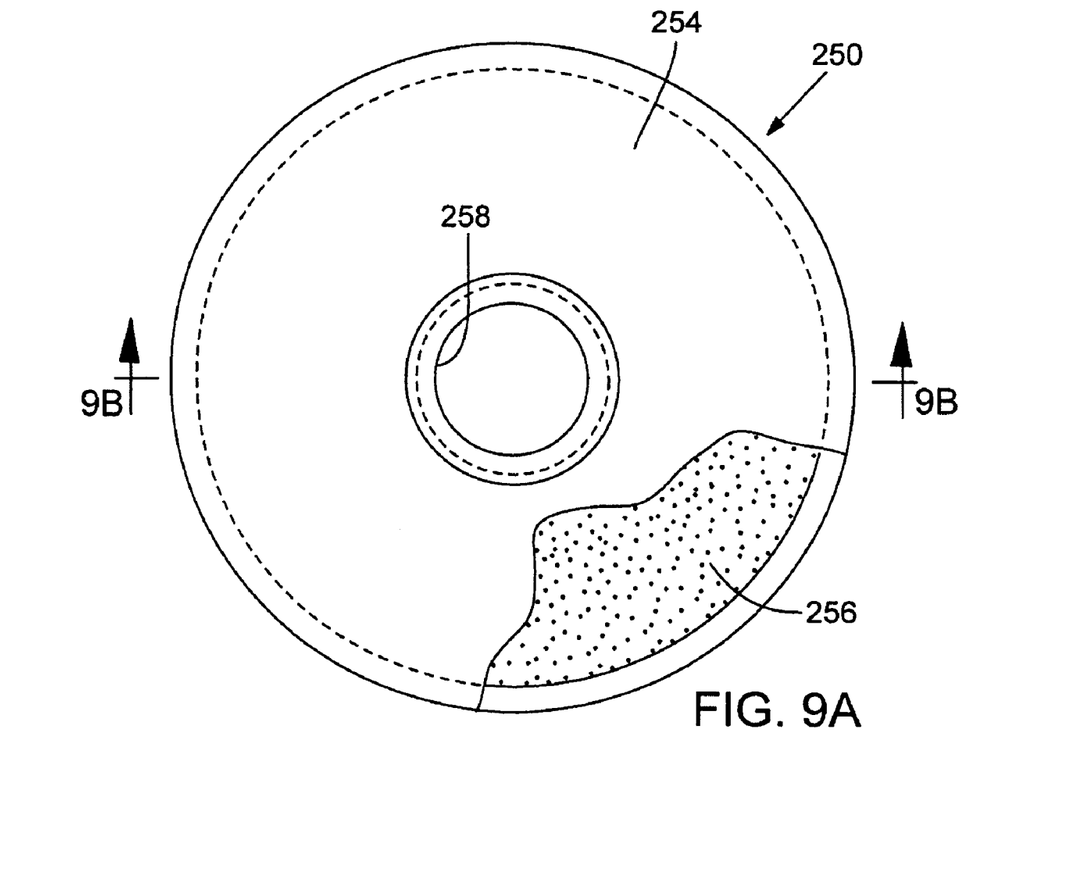
FIG. 9A is a top plan view of an insulated shielding member for use with a fiberizer spinner assembly, according to one embodiment.
Figure 9B:
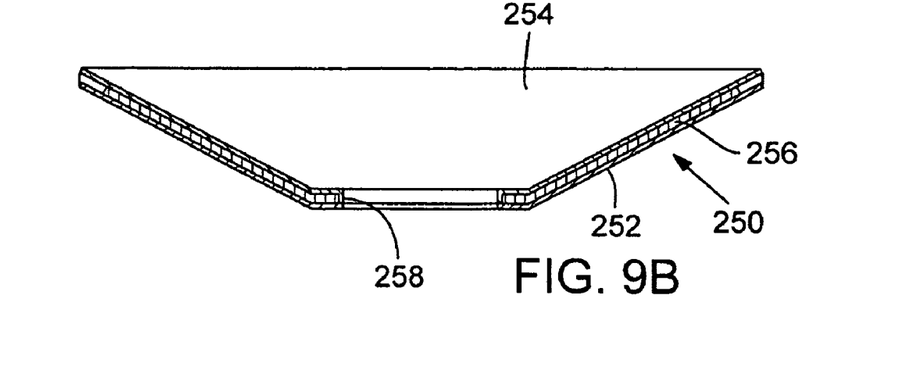
FIG. 9B is a cross-sectional view of the shielding member of FIG. 9A taken along line 9B-9B.

FIGS. 9A and 9B show an alternative embodiment of a heat shield (also referred to herein as a shielding member), indicated at 250, that can be mounted to the bottom of the spinner assembly 14 in lieu of the shield 28 shown in FIGS. 1, 2, and 8. The illustrated shield 250 includes a first, support layer 252, a second layer 254, and an insulating layer 256 interposed between the first and second layers. The insulating layer 256 can be made of any of various suitable insulating materials, such as ceramic fiber or carbon fiber. The first and second layers 252, 254 can be made from any suitable materials, such as metals or metal alloys. The shield 250 is formed with a central opening 258 that is sized to receive the end of the spindle 16 (FIG. 1) for mounting the shield to the spinner assembly. The shield 250 insulates the bowl 22 from the relatively cool central air flow 52 and can be used in lieu of or in addition to the shield 202 shown in FIG. 8.

Figure 10A:
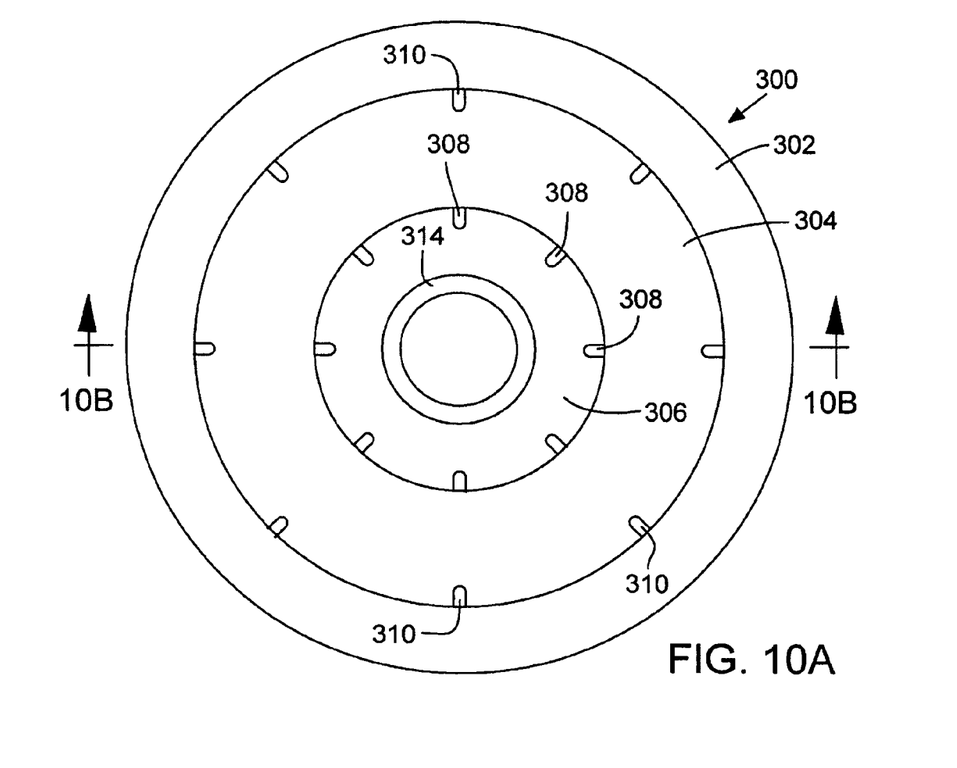
FIG. 10A is a bottom plan view of a shielding assembly of multiple shielding members mounted on a fiberizer spinner assembly, according to one embodiment.
Figure 10B:
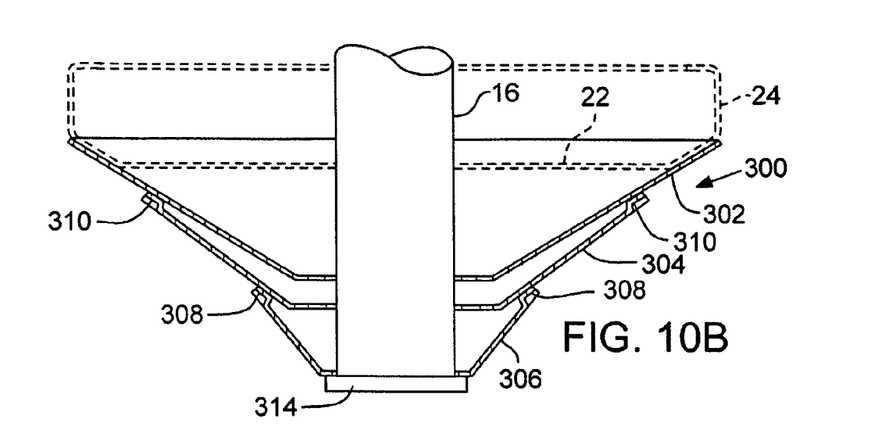
FIG. 10B is a cross-sectional view of the shielding assembly and spinner assembly of FIG. 10A taken along line 10B-10B.

FIGS. 10A-10B show a spinner shield assembly 300, according to one embodiment, that can be mounted to the spindle 16 for insulating the spinner assembly from the central air flow. The illustrated assembly 300 includes a large, upper shielding member 302, a medium, center shielding member 304 positioned underneath the upper shielding member, and a small, lower shielding member 306 positioned underneath the center shielding member 304.

The shielding members in the illustrated configuration are generally frustoconical in shape and are formed with respective central openings sized to receive the end portion of the spindle 16 below the bowl 22. A nut 314 can be tightened onto the end of the spindle to retain the shielding members on the spindle. As shown, a plurality of angularly spaced, raised protrusions, or projections 308 can be formed along the upper peripheral edge of the lower shielding member 306. The protrusions 308 serve to space the lower shielding member 306 from the center shielding member 304 so as to form an air gap therebetween. Likewise, the center shielding member 304 can be formed with a plurality of angularly spaced, raised projections, or protrusions, 310 to space the center shielding member 304 from the upper shielding member 302 and form an air gap therebetween. The protrusions 308, 310 can be formed by suitable techniques, such as by stamping the protrusions into the shielding members 306, 304.

While the illustrated shield assembly is shown as having three vertically stacked shielding members, this is not a requirement. Accordingly, in alternative embodiments, the shield assembly can have two shielding members or more than three shielding members.

Figure 11:
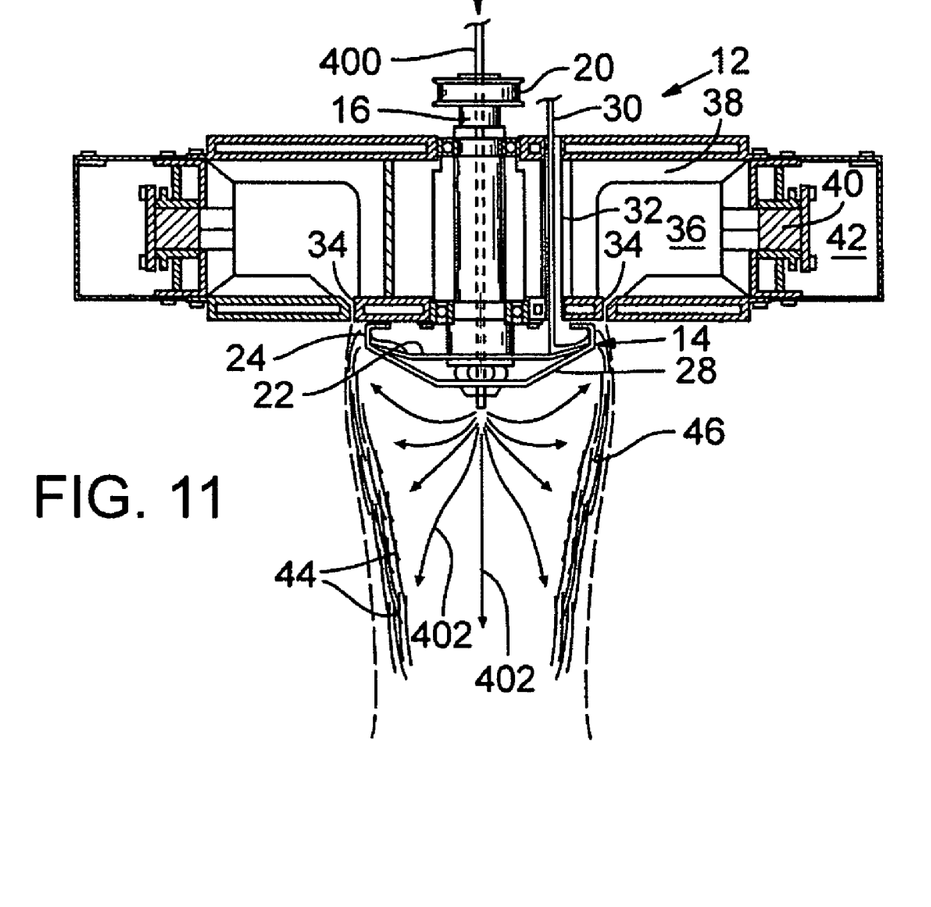
FIG. 11 is a vertical cross-sectional view of yet another embodiment of an apparatus for making glass fibers comprising a gas conduit that extends through a fiberizer spinner assembly.

FIG. 11 shows a fiberizer 12 that has been modified to include a gas conduit 400 that extends through and is generally coaxial with the spindle 16 of the spinner assembly 14. The upper end of the gas conduit 400 is fluidly connected to a source of relatively cool gas (e.g., compressed air) that can be regulated to vary the gas pressure within the conduit. The lower end of the gas conduit 400 extends slightly beneath the heat shield 28 of the spinner assembly 14. Although not shown in FIG. 11, a housing 53 (FIGS. 1-3) can be positioned below the fiberizer 12 to enhance a uniform flow of the veil 46 and protect the integrity of the veil.

As shown in FIG. 11, the gas conduit 400 introduces a continuous flow of gas 402, represented by arrows, into the area beneath the spinner assembly. The lower end of the conduit 400 can be provided with a nozzle (not shown) that is configured to direct the gas outwardly against the interior of the tubular fiber veil 46. It can be appreciated that the flow of gas 402 assists in preventing the formation of a low-pressure zone (with attendant toroidal air circulation) beneath the spinner assembly 14. As a result, the amount of remelt occurring within the fiber veil is substantially reduced relative to the amount that would occur in the absence of the gas 402. As can be appreciated, if the gas conduit 400 is used to prevent the formation of a low-pressure zone beneath the spinner assembly, it would not be necessary to use the duct assembly 50 (FIGS. 1-3).

As described above in connection with the use of the duct assembly 50, the gas supplied to conduit 400 may be developed at or below ambient temperature to lower the temperature of the fiber veil 46 to below the melting temperature of the fibers 44. The application of this cool air increases the tensile strength and the elongation of the paper sheets (or other products) manufactured from the fibers 44.

The present invention has been shown in the described embodiments for illustrative purposes only. The present invention may be subject to many modifications and changes without departing from the spirit or essential characteristics thereof. We therefore claim as our invention all such modifications as come within the spirit and scope of the following claims.

We claim:

1. An apparatus for producing fibers from molten material, comprising:
    a rotary-type fiberizer that is operable to produce from the molten material a column of fibers that flows in a downwardly directed path from the fiberizer;
    an elongated duct positioned to direct a flow of gas toward the fiberizer; and
    wherein the duct has an upright upper portion shaped to fit inside the column of fibers that emanates from the fiberizer and a lower portion that passes through the column of fibers, wherein the upper portion has a first cross-sectional area and the lower portion has a reduced, second cross-sectional area that is less than the first cross-sectional area where the fiber column flows over the lower portion, wherein the second cross-sectional area is elongated substantially in the direction of the path of the column of fibers, and the second cross-sectional area is taken at a plane perpendicular to a longitudinal axis of the lower portion;
    wherein the fiberizer comprises a rotatable spinner assembly comprising a bowl containing the molten material and a spinner shield assembly mounted below the bowl, the spinner shield assembly comprising at least a first shielding member and a second shielding member mounted below the first shielding member, wherein the second shielding member is formed with protrusions on a peripheral edge thereof to space the second shielding member from the first shielding member and form an air gap therebetween.

2. The apparatus of claim 1, wherein the second cross-sectional area has a curved end margin and side margins extending from respective ends of the end margin and converging at a common edge opposite the end margin.

3. The apparatus of claim 1, further comprising a housing surrounding at least a portion of the duct so that the column of fibers flows between the housing and the duct upper portion, wherein the duct lower portion extends from an inside surface of the housing to the duct upper portion.

4. The apparatus of claim 1, further comprising a compressed-gas conduit having an outlet positioned to direct compressed gas upwardly against a bottom edge of the fiber column so as to cause the fiber column to flow outwardly and away from the duct lower portion.

5. The apparatus of claim 1, wherein the spinner shielding assembly further comprises a third shielding member mounted below the second shielding member, wherein the third shielding member is formed with protrusions on a peripheral edge thereof to space the third shielding member from the second shielding member and form an air gap therebetween.

6. The apparatus of claim 1, wherein the shielding members are generally frustoconical in shape.

7. An apparatus for producing fibers from molten material, comprising:
    a rotary-type fiberizer that is operable to produce from the molten material a column of fibers that flows in a downwardly directed path from the fiberizer;
    an elongated duct positioned to direct a flow of gas toward the fiberizer; and
    wherein the duct has an upright upper portion shaped to fit inside the column of fibers that emanates from the fiberizer and a lower portion that passes through the column of fibers, wherein the upper portion has a first cross-sectional area and the lower portion has a reduced, second cross-sectional area that is less than the first cross-sectional area where the fiber column flows over the lower portion, wherein the second cross-sectional area is elongated substantially in the direction of the path of the column of fibers, and the second cross-sectional area is taken at a plane perpendicular to a longitudinal axis of the lower portion;
    wherein the fiberizer has a rotatable spinner assembly and the apparatus further comprises:
    a conduit for transporting a cooling gas passing through the spinner assembly and having an outlet located beneath the spinner assembly within the interior of the column of fibers to direct the cooling gas against the column of fibers so as to facilitate cooling of the fibers and to minimize the formation of a low pressure area beneath the spinner assembly.

8. The apparatus of claim 7, wherein the conduit extends generally coaxially through the spinner assembly.

9. The apparatus of claim 8, wherein the spinner assembly comprises a rotatable spindle and a bowl coupled to the spindle, wherein rotation of the spindle and the bowl causes molten material in the bowl to be ejected through openings in the bowl by centrifugal force, and wherein the conduit extends generally coaxially through the spindle and the bowl.

10. The apparatus of claim 7, further comprising a housing surrounding at least a portion of the column of fibers.

* * * * *